US010158764B2

(12) United States Patent
Dahl et al.

(10) Patent No.: US 10,158,764 B2
(45) Date of Patent: Dec. 18, 2018

(54) METHODS AND APPARATUS FOR ALLOCATING SERVICE COSTS IN A TELECOMMUNICATIONS NETWORK (71) Applicant: Telefonaktiebolaget L M Ericsson (publ), Stockholm (SE)

(72) Inventors: Jan Dahl, Älvsjö (SE); Ove Karlsson, Emmaboda (SE); Patrik Teppo, Bobäck (FI); Robert Törnkvist, Karlshamn (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 127 days.

(21) Appl. No.: 14/894,170

(22) PCT Filed: May 28, 2013

(86) PCT No.: PCT/EP2013/060985
§ 371 (c)(1),
(2) Date: Nov. 25, 2015

(87) PCT Pub. No.: WO2014/191027
PCT Pub. Date: Dec. 4, 2014

(65) Prior Publication Data
US 2016/0105567 A1    Apr. 14, 2016

(51) Int. Cl.
*H04M 15/00* (2006.01)
*H04L 29/06* (2006.01)
*H04L 12/14* (2006.01)

(52) U.S. Cl.
CPC ........ *H04M 15/60* (2013.01); *H04L 12/1403* (2013.01); *H04L 12/1425* (2013.01);
(Continued)

(58) Field of Classification Search
CPC ...... H04M 15/60; H04M 15/07; H04M 15/41; H04M 15/43; H04M 15/57;
(Continued)

(56) References Cited

U.S. PATENT DOCUMENTS

2005/0254510 A1* 11/2005 Oja ..................... H04L 65/1069
370/431
2006/0056607 A1* 3/2006 Halkosaari ............. H04L 12/14
379/114.12
(Continued)

FOREIGN PATENT DOCUMENTS

| EP | 1574034 A1 | 9/2005 |
| EP | 2086165 A1 | 8/2009 |
| WO | 2004056079 A1 | 7/2004 |

OTHER PUBLICATIONS

3GPP, "3rd Generation Partnership Project; Technical Specification Group Services and System Aspects; IP Multimedia Subsystem (IMS); Stage 2 (Release 11)", 3GPP TS 23.228 V11.7.0 (Dec. 2012), Dec. 2012, 1-290.
(Continued)

Primary Examiner — Qun Shen
(74) Attorney, Agent, or Firm — Murphy, Bilak & Homiller, PLLC (57) ABSTRACT A node for use in a telecommunication network. The apparatus comprises a service session handler for establishing and controlling service sessions on behalf of end users served by the telecommunications network, and a charging generation point for generating charging data for established sessions involving served users as originating users and for reporting that charging data to a network charging system. The apparatus further comprises a signalling message handler for receiving, in respect of a given service session between an originating and a terminating user, a signalling message sent by or on behalf of the terminating user, the signalling message containing cost apportionment data apportioning costs between the originating and terminating users, the signalling message handler being configured to pass that cost apportionment data to the charging generation point. The charging generation point is further configured to apply the cost apportionment data to the generation of charging data so that the charging data reflects the required cost apportionment.

28 Claims, 8 Drawing Sheets (52) U.S. Cl.
CPC ...... *H04L 12/1475* (2013.01); *H04L 65/1006* (2013.01); *H04L 65/1016* (2013.01); *H04L 65/1063* (2013.01); *H04M 15/07* (2013.01); *H04M 15/41* (2013.01); *H04M 15/43* (2013.01); *H04M 15/57* (2013.01); *H04M 15/63* (2013.01); *H04M 15/64* (2013.01); *H04M 15/65* (2013.01); *H04M 15/8228* (2013.01)

(58) Field of Classification Search
CPC ... H04M 15/63–15/64; H04M 15/8228; H04L 12/1403; H04L 12/1475; H04L 65/1063
See application file for complete search history.

(56) References Cited

U.S. PATENT DOCUMENTS

| | | | | |
|---|---|---|---|---|
| 2007/0021138 | A1* | 1/2007 | Allen | H04W 4/10 455/518 |
| 2008/0144615 | A1* | 6/2008 | Casey | H04L 29/125 370/389 |
| 2009/0168758 | A1* | 7/2009 | Apelqvist | H04L 29/12066 370/352 |
| 2009/0303987 | A1* | 12/2009 | Mao | H04L 47/125 370/352 |
| 2011/0170455 | A1* | 7/2011 | Cai | H04L 12/1403 370/259 |
| 2012/0263175 | A1* | 10/2012 | Wang | H04L 29/06027 370/352 |

OTHER PUBLICATIONS

3GPP, "3rd Generation Partnership Project; Technical Specification Group Services and System Aspects; Network architecture (Release 11)", 3GPP TS 23.002 V11.5.0 (Dec. 2012), Dec. 2012, 1-105.

ETSI, "Integrated Services Digital Network (ISDN); Signalling System No. 7 (SS7); ISDN User Part (ISUP); Signalling aspects of charging", ETSI ES 201 296 V1.3.1 (Apr. 2003), Apr. 2003, 1-47.

Calhoun, P. et al., "Diameter Base Protocol", Internet Engineering Task Force, Network Working Group, Request for Comments: 3588, Category: Standards Track, Sep. 2003, pp. 1-148.

Hakala, H. et al., "Diameter Credit-Control Application", The Internet Society, Network Working Group, Request for Comments: 4006, Category: Standards Track, Aug. 2005, pp. 1-104.

Unknown, Author, "3GPP TS 24.647 V11.1.0 (Dec. 2011)", 3rd Generation Partnership Project; Technical Specification Group Core Network and Terminals; Advice of Charge (AOC) using IP Multimedia (IM) Core Network (CN) subsystem (Release 11), Dec. 2011, pp. 1-36.

Unknown, Author, "3GPP TS 29.658 V11.0.0 (Sep. 2012)", 3rd Generation Partnership Project; Technical Specification Group Core Network and Terminals; SIP Transfer of IP Multimedia Service Tariff Information; Protocol specification (Release 11), Sep. 2012, pp. 1-39.

Unknown, Author, "3GPP TS 32.240 V11.6.0 (Mar. 2013)", 3rd Generation Partnership Project; Technical Specification Group Services and System Aspects; Telecommunication management; Charging management; Charging architecture and principles (Release 11), Mar. 2013, pp. 1-45.

Unknown, Author, "3GPP TS 32.260 V11.7.0 (Mar. 2013)", 3rd Generation Partnership Project; Technical Specification Group Services and System Aspects; Telecommunication management; Charging management; IP Multimedia Subsystem (IMS) charging (Release 11), Mar. 2013, pp. 1-167.

Unknown, Author, "3GPP TS 32.280 V11.0.0 (Sep. 2012)", 3rd Generation Partnership Project; Technical Specification Group Services and System Aspects; Telecommunication management; Charging management; Advice of Charge (AoC) service (Release 11), Sep. 2012, pp. 1-46.

Unknown, Author, "3GPP TS 32.299 V11.7.0 (Mar. 2013)", 3rd Generation Partnership Project; Technical Specification Group Services and System Aspects; Telecommunication management; Charging management; Diameter charging applications (Release 11), Mar. 2013, pp. 1-152.

Unknown, Author, "3GPP TS 32.299 V12.0.0 (Mar. 2013)", 3rd Generation Partnership Project; Technical Specification Group Services and System Aspects; Telecommunication management; Charging management; Diameter charging applications (Release 12), Mar. 2013, pp. 1-152.

* cited by examiner

METHODS AND APPARATUS FOR ALLOCATING SERVICE COSTS IN A TELECOMMUNICATIONS NETWORK

TECHNICAL FIELD

The present invention relates to methods and apparatus for allocating service costs in a telecommunications network. It is applicable in particular to those networks using the IP Multimedia Subsystem to establish and control service delivery.

BACKGROUND

IP Multimedia Subsystem (IMS) is the technology defined by the Third Generation Partnership Project (3GPP) to provide IP Multimedia services over mobile communication networks. The architecture and general features of the IMS are described generally in 3GPP specification TS 23.002 and, in more detail, in TS 23.228. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

The IMS is logically structured into a so-called "core network" layer and a so-called "service layer". The core network layer is implemented by functional entities which are briefly described below. The service layer essentially comprises "Application Servers" arranged to provide services to user terminals (referred to hereinafter as User Equipment (UE)). These Application Servers are connected via the IMS, and/or arranged to mediate in the provision of services by executing specific service-based logic, such as to divert an incoming multimedia session in certain circumstances.

Of particular interest here is the Serving Call Session Control Function (S-CSCF) which is present within the IMS core network. The S-CSCF performs session control services for a UE and maintains a session state according to the (SIP) signalling exchanged with a UE for supporting the services originated and/or terminated by the UE. The S-CSCF can also communicate with Application Servers (ASs) of the IMS service layer to handle services for users. Further details of the functionality of a S-CSCF are given in chapter 4.6.3 of 3GPP specification TS 23.228.

Whilst the 3GPP organisation originally proposed the IMS in the context of mobile networks, it is noted that the IMS also finds application in respect of fixed access networks. A typical operator architecture may utilise the IMS to seamlessly deliver services over both a fixed and a mobile network.

Figure 1:
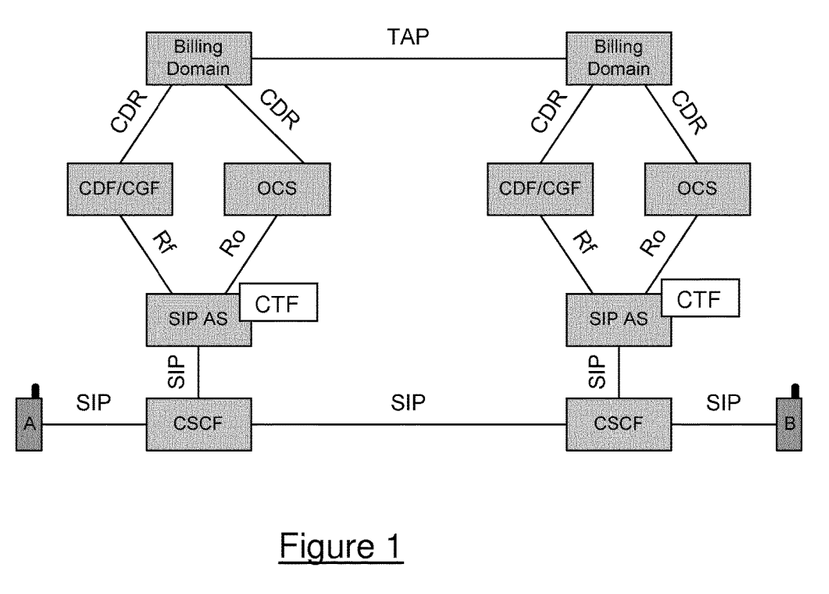
FIG. 1 illustrates schematically an IMS network architecture for implementing online and offline charging.

Charging in the IMS is facilitated by interfaces between IMS nodes within a given network, and a network operator billing system. Both online and offline charging are typically (although not always) provided for within a given IMS network. Within the IMS, charging information is generated at a Charging Trigger Function (CTF). A CTF may be implemented, for example, in an AS responsible for implementing a particular service. [CTFs may also be implemented, for example, in CSCFs as well as in other SIP network entities.] FIG. 1 illustrates schematically IMS network entities that are involved in establishing a session, e.g. an MMTel session, between two users A and B. Various components, such as P-CSCFs, I-CSCFs, etc are omitted for simplicity. In the illustrated example, users A and B are registered with respective, different IMS networks. CTFs are implemented at the SIP ASs on both sides of the network, and may send charging information (i.e. charging events and/or charging requests) to an offline charging function (Charging Data Function/Charging Gateway Function, CDF/CGF) via the Rf interface. Alternatively, the CTF may send charging information to an Online Charging System (OCS) via the Ro interface. The online and offline charging functions may additionally receive charging information from other CTFs in the IMS network. The online and offline charging functions may, in turn, send Charging Data Records (CDRs) to the respective operators billing domain. Network operators' billing domains must exchange charging data in order to reconcile their accounts and to determine, on a regular basis, how much money needs to be exchanged.

In the case of a given IMS session, CTFs on both sides of the session will simultaneously be sending charging information to one or other of the respective offline and online charging functions. In the case, for example, of an MMTel voice call, where user A is the calling party and user B is the called party, the originating side will typically generate charging information such that the CDRs provided to the originating side billing domain will identify that money is to be paid to the terminating side network operator. The terminating side will, on the other hand, cause CDRs to be provided to the terminating side billing domain identifying that money is owed to the terminating side network operator by the originating side network operator. Information is exchanged between the two billing domains to allow for inter-operator settlements. Further details of IMS charging mechanisms are given, for example, in 3GPP TS 32.229.

Typically, the originating side billing domain will apply a given tariff for the session. It will be aware of how much it is required to pay to the terminating side in respect of the session and the applied tariff will take this into account. The terminating side billing system will be aware of what it should be paid for the session, although it will probably not be aware of the total charge made to user A. Of course, more complex scenarios exist, e.g. where one or both of user A and user B are roaming in visited networks.

As well as the more usual services where a calling party (or more generally speaking, the session initiating party) is charged for a service, telecommunication networks commonly provide for so-called premium rate and free-phone services. A special case of the free-phone service is the sponsored call service according to which a session initiating party is charged only for a proportion of the total service cost. Thus for example, a calling party calling a mobile number may pay only a fixed line local tariff, whilst the remainder of the cost is paid by a network operator or "owner" of the mobile number. Whilst such services, including sponsored call services, are usually offered in respect of voice calls, they are in most cases also applicable for messaging (e.g. SMS and MMS) or even web browsing services.

These alternative charging scenarios are generally handled by essentially "static" agreements configured in the billing systems. For example, in the architecture of FIG. 1 where user A is the calling party, the billing domain of user A will be aware that calls made to a number prefixed with "0800" are freephone calls, and that user A should not be charged for the call, with all charges being accepted by the network of user B.

This approach to handling alternative charging scenarios in the IMS is not particularly flexible. It is difficult to manage as tariffs and number series must be preconfigured across a possibly large number of billing domains, and, at the same time, is unlikely to allow fine grain control of billing, e.g. it might not be possible to apply a special tariff to a specific number (as opposed to a number series). The known approach is also unlikely to allow individual users, including domestic users and corporate users, to apply their own alternative charging scenarios.

SUMMARY

According to a first aspect of the present invention there is provided a node for use in a telecommunication network. The apparatus comprises a service session handler for establishing and controlling service sessions on behalf of end users served by the telecommunications network, and a charging generation point for generating charging data for established sessions involving served users as originating users and for reporting that charging data to a network charging system. The apparatus further comprises a signalling message handler for receiving, in respect of a given service session between an originating and a terminating user, a signalling message sent by or on behalf of the terminating user, the signalling message containing cost apportionment data apportioning costs between the originating and terminating users, the signalling message handler being configured to pass that cost apportionment data to the charging generation point. The charging generation point is further configured to apply the cost apportionment data to the generation of charging data so that the charging data reflects the required cost apportionment.

The telecommunication network may be an IMS network with which said served users are registered, and said signalling message handler is a SIP message handler for receiving, in respect of a given service session between an originating and a terminating user, a SIP message sent by an IMS network in which the terminating user is registered or sent on behalf of a non IMS terminating user.

The cost apportionment data may identify a proportion of an originating network cost that the terminating user accepts to pay.

The network charging system may comprise one or both of an offline and an online charging service, said charging generation point using either an Rf or an Ro interface to send said charging data to the charging service. The charging generation point is configured to send details of charges apportioned to the originating user to said online charging service and details of charges apportioned to the terminating user to said offline charging service.

The cost apportionment data may include an information element indicating that the terminating user accepts to sponsor the session.

According to a second aspect of the present invention there is provided a node for use in a telecommunications network. The node comprises a service session handler for establishing and controlling service sessions on behalf of end users served by the telecommunications network, and a charging determination point for determining cost apportionment data for service sessions involving registered users as terminating users. There is further provided a signalling message handler for generating, in respect of a given service session between an originating and a terminating user, a signalling message containing said cost apportionment data, the signalling message handler being configured to send the signalling message towards a charging generating point in a peer network serving the originating user.

The telecommunications network may be an IMS network with said served end users being registered with the IMS network, and wherein said peer network is also an IMS network, said signalling message handler being a SIP message handler.

The cost apportionment data may identify a proportion of an originating network cost that the terminating user accepts to pay, with the charging determination point being configured to report said charging data to a network charging system. The network charging system may be an offline billing service, and said charging data includes details of charges apportioned to the terminating user.

According to a third aspect of the present invention there is provided a method of handling costs associated with a service session established and controlled by a telecommunications network, where a session originating user is served by the telecommunications network and a session terminating user is served by a terminating network. The method comprises, either during session establishment or during the session, receiving within the telecommunications network a signalling message containing cost apportionment data, and routing the received signalling message to a node responsible for the service and implementing a charging generation function. The method further comprises, at the node, applying the cost apportionment data to the generation of charging data so that the charging data reflects the required cost apportionment, and sending the charging data to a network charging system.

The telecommunications network may be an IMS network with which said session originating user is registered, said signalling message is a SIP message, and said node is a SIP node.

The network charging system may comprise one or both of an online charging system and an offline charging function, and the network charging system generates Charging Data Records, CDRs, in accordance with the received charging data, and sends the CDRs to a network Billing Domain, the Billing Domain in turn generating one or more billing records and sending these to a Billing Domain associated with said terminating network.

The cost apportionment data may identify a proportion of an originating network cost that the terminating user accepts to pay, and said billing record(s) identifies to the Billing Domain of the terminating network a cost that it must pay to the originating network. It may further comprise identifying costs apportioned to the originating user to the online billing system and identifying costs apportioned to the terminating user to the offline billing system. The cost apportionment data may identify a proportion of an originating network cost that the terminating user accepts to pay.

At said terminating network, costs apportioned to the terminating user may be identified to a network charging system of the terminating network via an offline charging system.

DETAILED DESCRIPTION

In the context of the IP Multimedia Subsystem (IMS), it is proposed here to enable a terminating network to indicate to an originating network that a terminating user will sponsor the cost of a service session, e.g. a voice or video call, and to what extent. Thus, the terminating network can indicate that the terminating user will pay, for example, a percentage of the cost, a fixed maximum value or a combination of both. The originating network will cause the originating user to be charged based on the received sponsoring information.

A Real-Time Transfer of Tariff Information (RTTI) mechanism already exists in the IMS that allows a destination network to indicate a price by sending tariff information back to an originating network. RTTI provides for the realtime transfer of charging information in SIP, in the form of an RTTI XML message schema, between a Charging determination Point (CDP) and a Charging generation Point (CGP). The CDP determines which tariff/add-on charge should be applied and inserts the charging information into the appropriate SIP requests or responses. An example of a CDP is a SIP AS in a terminating network providing a premium rate service. The CGP may be an originating SIP AS in the originating IMS. Existing RTTI functionality supports the charging of value added services by the home network operator in a dynamic way. RTTI is described further in 3GPP TS 29.658.

The existing RTTI mechanism allows the destination network to set the tariff (free, cost per unit or a surcharge). This covers the premium rate case and to some extent also the free-phone case, but does not encompass sponsored calls.

One possible way of transferring sponsoring information between networks is to use the existing RTTI function and extend it with extra parameters to indicate that a given service session is sponsored and to identify the extent of the sponsorship. The identity of the sponsor, such as MSISDN, should also be included as the originating network, e.g. a Charging Data Function (CDF) at an Rf reference point, may not have the identity required for charging of the sponsor. Further sponsoring details can also be added such as the type of media; e.g. only audio, video but not audio, etc.

A decision to sponsor a session can be triggered at session establishment, e.g. as a terminating service, as well as during the session. Triggering may be made by the terminating network, for example a SIP Application Server, using Supplementary Service Codes. When triggered mid-session, it may be necessary for the terminating network to indicate whether (or not) the sponsorship is valid from the start of the session or from the time of sponsorship triggering. When triggered mid-session, sponsorship information may be transferred using, for example, the SIP INFO method. A "sponsor" info package can then be created for inclusion in the SIP INFO method that includes all required data, preferably in the same format as when transferred at session establishment. When receiving sponsoring information, the originating network will reduce the cost of the call in line with the received information, and the terminating network will add an extra cost to the terminating user.

New RTTI information elements will make it possible for a terminating user to accept all or parts of the cost for a call from the originating user, and thus enable new service types and charging models. Using RTTI as the mechanism to transfer sponsorship information allows a solution to be implemented which has a relatively small impact on existing implementations. Treating the sponsor as a "roaming" user makes it possible to re-use existing mechanisms, including the use of TAP records as discussed below, and agreements to transfer money between operators.

As an extra service to an originating user, announcements could be triggered by receipt (in the originating network) of a sponsorship indication, to inform the originating user of the sponsored session. This might be especially useful in case that sponsoring rules change during a session, e.g. sponsorship is removed after some maximum (cost) level is reached.

Figure 2:
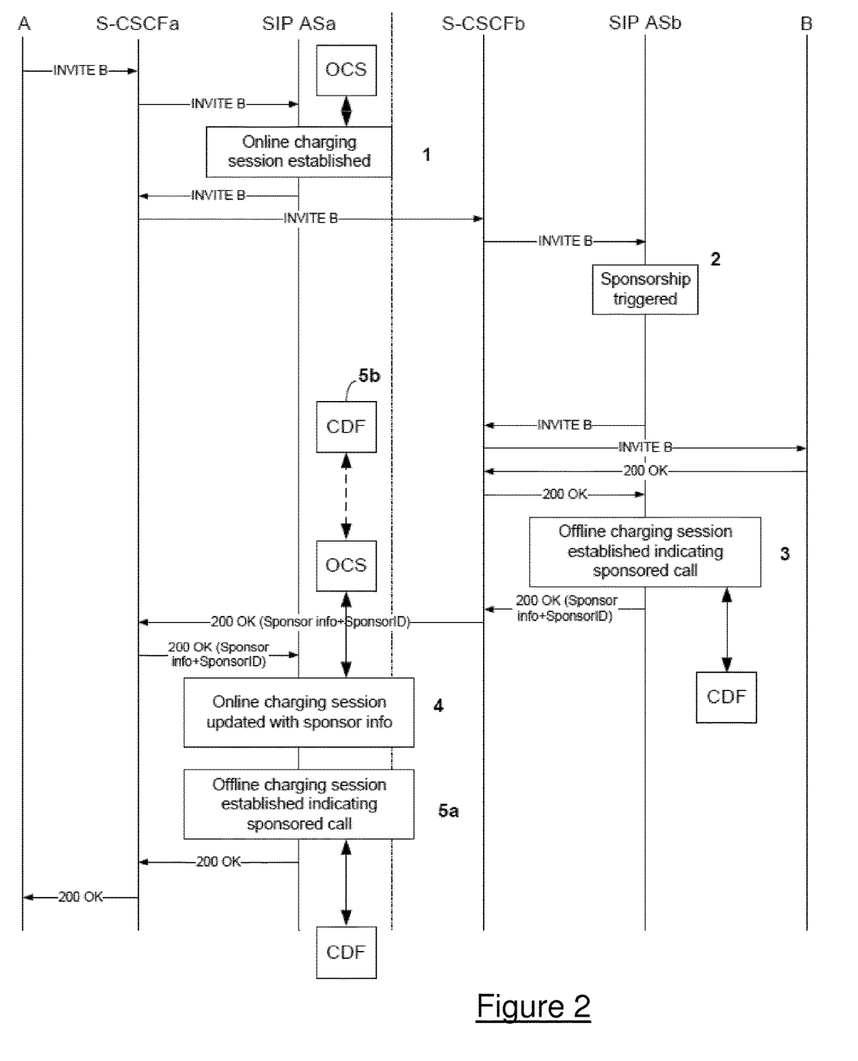
FIG. 2 illustrates signalling associated with a sponsored IMS session where an originating user is charged online and a terminating user is charged offline.

FIG. 2 illustrates a high level signalling flow associated with the approach described above, where sponsorship is triggered at session establishment and where both users are attached to IMS networks. This example considers the case where the originating party, User A, is charged online whilst the terminating party, User B, is charged offline. As shown, during the session initiation phase, online charging is triggered for User A at the SIP AS (SIP ASa). According to standard online charging procedures, SIP ASa requests a quota (e.g. a number of time units) for the session on behalf of User A, from the online charging system (OCS) using e.g. a Diameter Credit Control protocol. This process is, at this stage, unaffected by any sponsorship criteria. Subsequently during session initiation, sponsorship of the session is triggered by logic in the SIP AS in the terminating network, SIP ASb.

SIP ASb includes the (RTTI) cost apportionment data into the SIP 200 OK that is sent towards the originating network. The identity of the sponsor, such as MSISDN, is also included as the originating network, e.g. a CDF at an Rf reference point, may not have the identity required for charging the sponsor. At the same time, SIP ASb triggers offline charging for User B by establishing a Diameter Accounting session with a CDF. The charging session is established based upon the sponsorship model and ensures that the terminating network's charging system is aware of how much must be charged to User B's account (also ensuring that the terminating network's billing domain will subsequently accept a TAP record from the originating network—see below for a further discussion of the use of TAP records in this context).

Upon receipt of the 200 OK, SIP ASa updates the online charging session (originating side) with the cost apportionment data to ensure that User A will only be charged for the agreed portion of the session cost. An updated quota might be provided to SIP ASa. The SIP ASa also initiates offline charging (5a) relating to the portion of the session cost that will be charged to User B (this results in the generation of one or more TAP records—again, see below) by establishing an offline charging session over, for example, a Diameter Accounting protocol towards a CDF address defined for the sponsor service. Alternatively, the offline charging session towards the CDF might be established by the OCS (5b).

Figure 3:
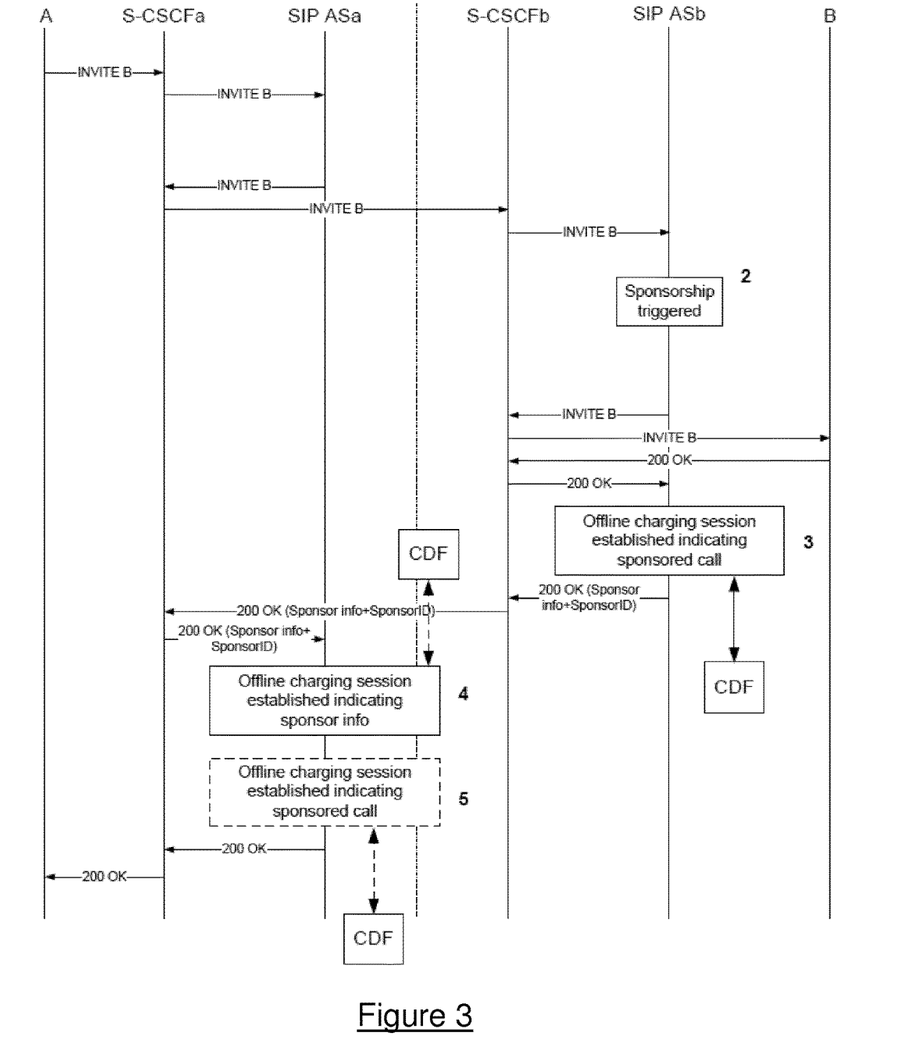
FIG. 3 illustrates signalling associated with a sponsored IMS session where both an originating user and a terminating user are charged offline.

FIG. 3 illustrates a similar scenario to that illustrated in FIG. 2, but considers the case where both User A and User B are charged offline. The signalling process differs from that illustrated in FIG. 2 in that an offline charging session is established at SIP ASa following receipt of the 200 OK, containing the RTTI cost apportionment data, from the terminating network. A single offline charging session may be established in the originating network to include both charges made to User A and charges to be recovered from User B, although separate offline charging sessions may alternatively be established.

Figure 4:
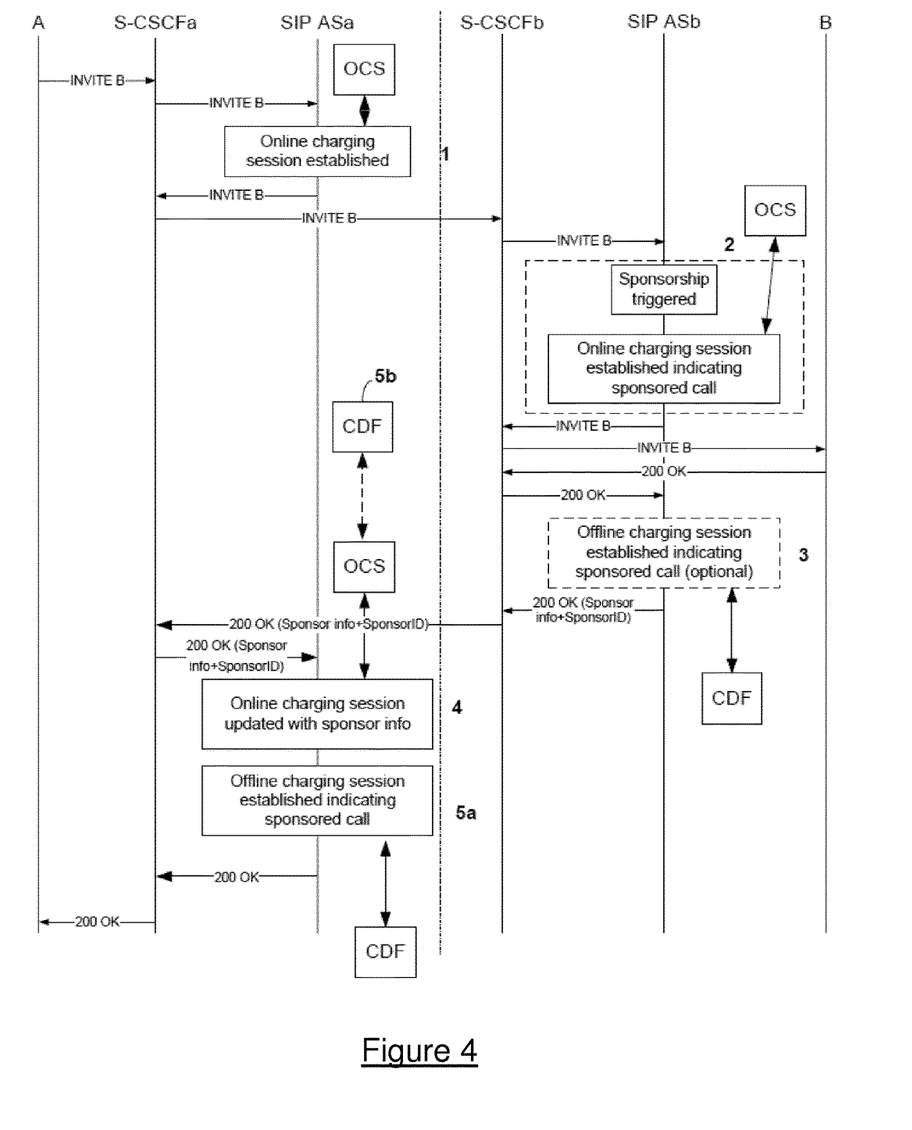
FIG. 4 illustrates signalling associated with a sponsored IMS session where both an originating user and a terminating user are charged online.

FIG. 4 again illustrates a similar to scenario to that illustrated in FIG. 2, but considers the case where both User A and User B are charged online. The key difference over FIG. 2 is that the triggering of sponsorship at SIP ASb further triggers the establishment of an online charging session for User B. This might involve ASb sending a DCC CCR and receiving in return a quota and sponsoring information. The quota is used for "surveillance" of the traffic involving ASb in the same way that a quota is used to manage any other realtime charging process for traffic. Alternatively, a CCR request may be sent to the OCS and sponsoring information returned. A second CCR is then sent to the OCS requesting a quota based on the sponsoring information. The procedure on the originating side is that same as that described with reference to FIG. 2. Optionally, an offline charging session is established based upon the sponsorship model and ensures that the terminating network's billing domain will subsequently accept a TAP record from the originating network.

Figure 5:
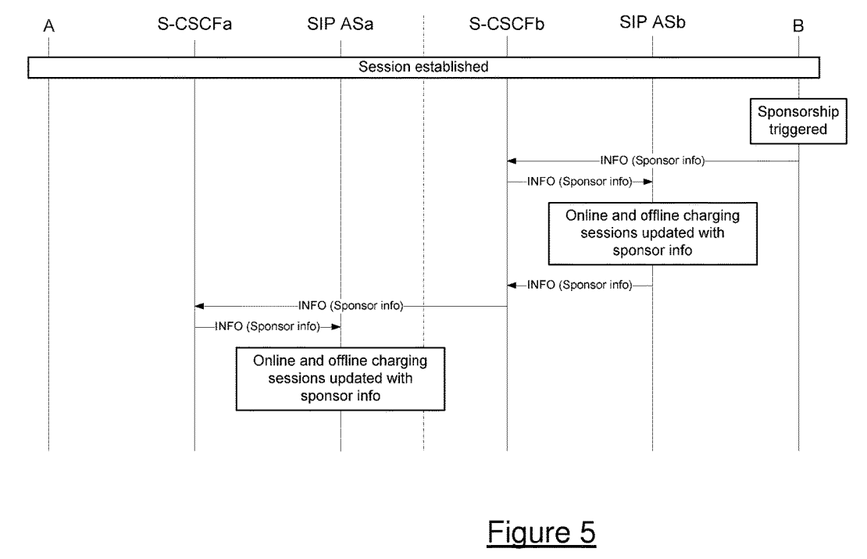
FIG. 5 signalling associated with a sponsored IMS session where sponsorship is triggered during an established session.

Turning now to FIG. 5, this relates to the case where sponsorship is triggered during a session. In this case, the cost apportionment data is sent from the terminating network to the originating network in a SIP INFO message. Online and/or offline charging sessions are updated at both sides to reflect the (new) cost apportionment. FIG. 5 is not specific as regards online and offline charging. It is assumed that these are in line with the charging processes described above with reference to FIGS. 2 to 4.

RTTI provides a mechanism to share cost information between the terminating and originating networks in realtime. There remains however the issue of synchronising the session related billing information held by the billing domains of the two sides in order to facilitate the actual transfer of money from the terminating operator to the originating operator. The problem being addressed is analogous to that of a roaming user attached to a visited mobile network. In the case of such a roaming user, for a given call one or more Transferred Account Procedure (TAP) record are generated in the visited network containing details of the call including, for example, location, calling party, called party, time of call and duration, etc. Each TAP record is rated according to the tariff charged by the visited network operator. TAP records are sent from the visited network to the home network. The home operator then bills the call to the user and may charge a mark-up/tax applicable locally.

This approach can be adapted to the sponsored call scenario, where the sponsor is treated as a "roaming user" and a TAP record is generated by the originating network and sent to the terminating network, indicating "sponsorship" and including all required call details, to thereby cover the remaining costs for the call, i.e. those costs not charged to the calling party. [NB. the terminating network can add the extra cost to the account of the terminating user directly, i.e. during and/or immediately following a session, or later when the TAP record is sent]

Figure 6:
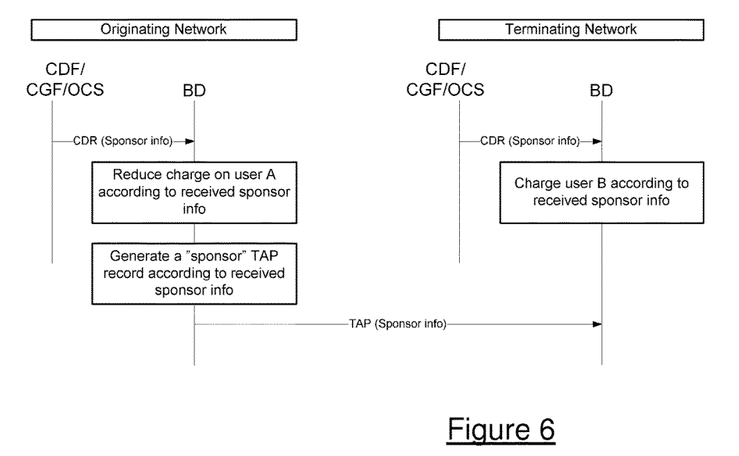
FIG. 6 illustrates signalling associated with charging reconciliation and involving billing domains of both a terminating and an originating network.

FIG. 6 illustrates high level signalling associated with this operator intercharging approach. CDRs are generated in both the originating and terminating networks and are provided to the respective Billing Domains (BDs). As it is the terminating network that must pay money to the originating network for the session, a TAP record(s) is(are) sent from the latter to the former.

Figure 7:
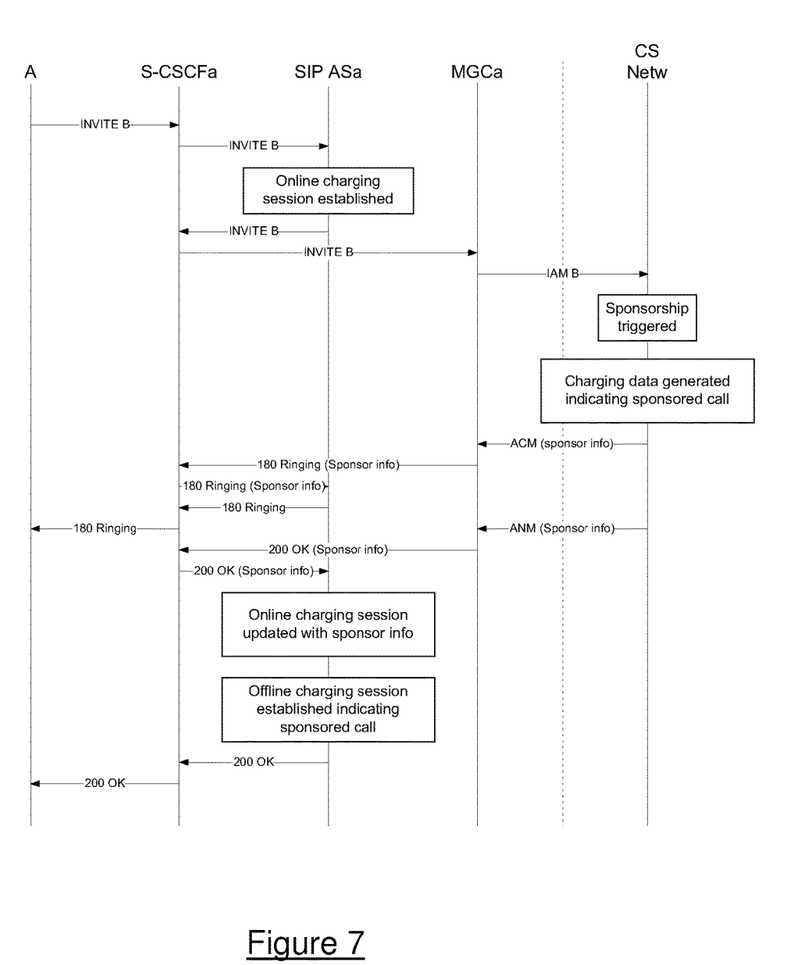
FIG. 7 illustrates signalling associated with a sponsored session in which an originating user is registered with an IMS network and a terminating user is registered with a Circuit Switched access network.

Although the sponsorship solution has been described above in the context of an end-to-end IMS session, it may also be applied to the case where only one user is registered with an IMS network. An example scenario is illustrated in FIG. 7, where the terminating user is attached to a Circuit Switched (CS) network and it is assumed that online charging is applied to the originating user. In this scenario, session control signalling passes through a Media Gateway Controller (MGCa) which converts SIP signalling on the one side into CS signalling on the other. As the CS network is the terminating side, it includes cost apportionment data into the ACM message at session set up. This might be enabled by extending ETSI ES 201 296, ISDN User Part (ISUP); Signalling Aspects of Charging. The ACM message is converted into a SIP 200 OK at the MGC, with the cost apportionment being included in the appropriate RTTI format. Otherwise, the originating network behaves in accordance with FIG. 2.

Figure 8:
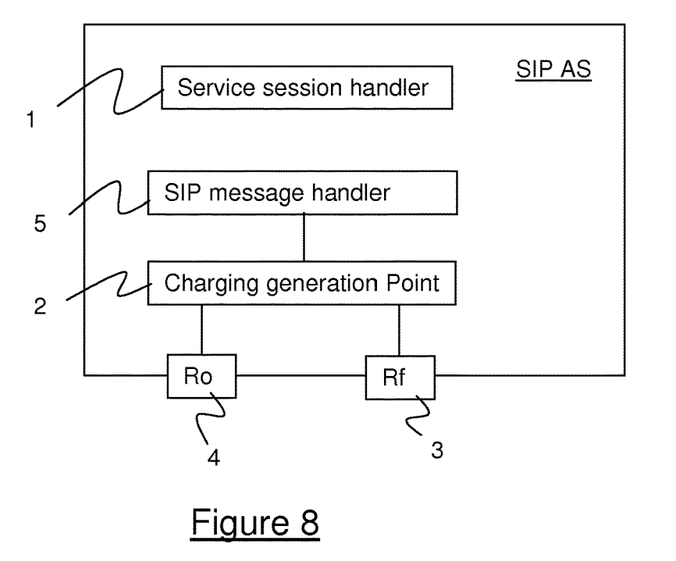
FIG. 8 illustrates schematically a SIP AS configured to implement cost apportionment for a sponsored call within an originating network.

FIG. 8 illustrates schematically a SIP AS for use in an IP Multimedia Subsystem and configured to implement a sponsorship charging model on behalf of an originating user that is registered with the IMS network. The SIP AS may be considered to be the SIP ASa referred to above and in the accompanying Figures. The SIP AS comprises a service session handler 1 for establishing and controlling service sessions on behalf of end users registered with the IMS network. It further comprises a charging generation point (CGP) 2 for generating charging data for established sessions involving registered users as originating users and for reporting that charging data to a network charging system. For this purpose the SIP AS comprises at least an Rf interface 3 for offline billing and optionally an Ro 4 interface for online billing.

The SIP AS further comprises a SIP message handler 5 for receiving, in respect of a given service session between the originating user and a terminating user, a SIP message sent by an IMS network in which the terminating user is registered, and including the cost apportionment data. Alternatively, that SIP message may be sent on behalf of a non-IMS terminating user, e.g. according to the scenario described with reference to FIG. 7. The SIP message handler 5 parses the SIP message to identify the cost apportionment data and passes this to the charging generation point 2. The charging generation point 2 is further configured to apply the cost apportionment data to the generation of charging data so that the charging data reflects the required cost apportionment. Appropriate information is sent over the Rf and, optionally, the Ro interface.

Figure 9:
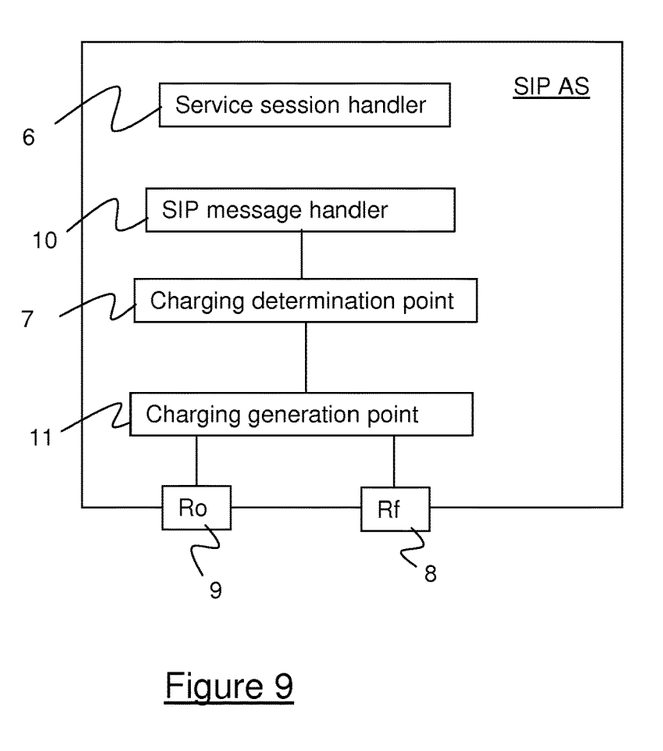
FIG. 9 illustrates schematically a SIP AS configured to implement cost apportionment for a sponsored call within a terminating network.

FIG. 9 illustrates schematically a SIP AS configured to operate within the terminating network in an IMS session case, i.e. operating as per SIP ASb above. The AS comprises a service session handler 6 for establishing and controlling service sessions on behalf of end users registered with the IMS (terminating) network. A charging determination point 7 is provided for determining cost apportionment data for service sessions involving registered users as terminating users. The AS further comprises a SIP message handler 10 for generating (including modifying), in respect of a given service session between an originating and a terminating user, a SIP message containing said cost apportionment data. The SIP message handler 10 is configured to send the SIP message towards a charging generating point in an IMS network in which an originating user is registered.

The SIP AS also comprises a Charging generation Point 11 communicating with at least an Rf interface 8 for performing offline billing, and optionally an Ro interface 9 for online billing. The CGP 11 obtains sponsorship information from the charging determination point 7 and performs online and/or offline billing in respect of the terminating user.

Figure 10:
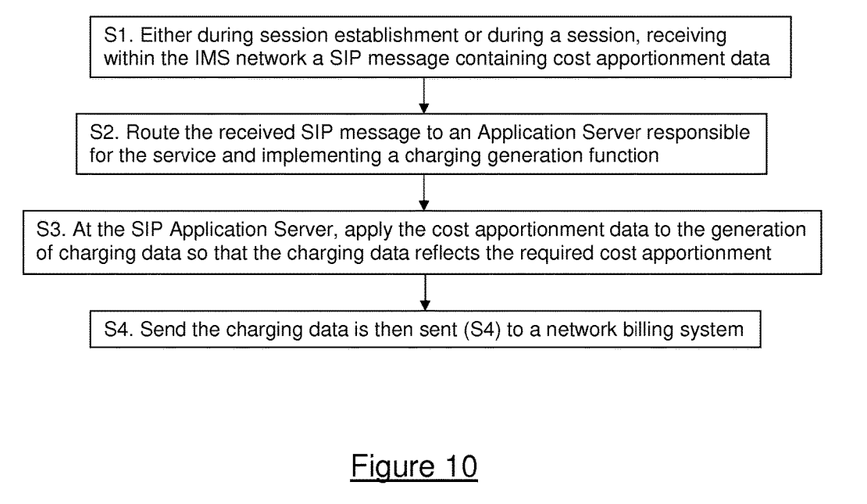
FIG. 10 is a flow diagram showing a procedure for implementing cost apportionment for a sponsored call.

Referring now to FIG. 10, this Figure is a flow diagram illustrating at a very high level the approach described above, i.e. where a session originating user is registered with an IMS network and a session terminating user is registered with a terminating network. The method comprises (S1), either during session establishment or during the session, receiving within the IMS network a SIP message containing cost apportionment data. The received SIP message is routed (S2) to an Application Server responsible for the service and implementing a charging generation function. At the SIP Application Server, the cost apportionment data is applied (S3) to the generation of charging data so that the charging data reflects the required cost apportionment. The charging data is then sent (S4) to a network charging system.

It will be appreciated by the person of skill in the art that various modifications may be made to the above described embodiments without departing from the scope of the invention. For example, whilst the invention has been exemplified above in the context of IMS, the invention may also be applicable to non-IMS architectures including end-to-end CS architectures.

The invention claimed is:

1. A node for use in a telecommunication network and comprising:
   a service session handler for establishing and controlling service sessions on behalf of end users served by the telecommunications network;
   a charging generation point for generating charging data for established sessions involving served users as originating users and for reporting the charging data to a network charging system; and
   a signalling message handler for receiving, in respect of a given service session between an originating and a terminating user, a signalling message sent by or on behalf of the terminating user, the signalling message containing cost apportionment data initiating apportioning costs between the originating and terminating users for the given service session, the signalling message handler being configured to pass the cost apportionment data to the charging generation point,
   the charging generation point being further configured to apply the cost apportionment data to the generation of charging data so that the charging data reflects a required cost apportionment,
   wherein the telecommunications network is an Internet Protocol Multimedia Subsystem (IMS) network with which the originating user is registered, the signalling message is a Session Initiation Protocol (SIP) message, the node is a SIP node, and the cost apportionment data is in the form of Real Time Transfer of Tariff Information (RTTI) data.

2. The node according to claim 1, wherein the signalling message handler is a SIP message handler and the signalling message is a SIP message sent by an IMS network in which the terminating user is registered or sent on behalf of the terminating user as a non IMS terminating user.

3. The node according to claim 2, the node being configured to operate as a SIP Application Server (AS).

4. The node according to claim 2, wherein said cost apportionment data identifies a proportion of an originating network cost that the terminating user accepts to pay.

5. The node according to claim 2, said service session handler being configured to establish and control Multimedia telephony (MMTel) service sessions.

6. The node according to claim 2, wherein said SIP message handler is configured to parse said SIP message according to the RTTI data, to identify said cost apportionment data.

7. The node according to claim 6, wherein said cost apportionment data is identified in the form of an extended RTTI XML schema.

8. The node according to claim 2, wherein said SIP message handler is configured to receive said SIP message at initiation of said given service session.

9. The node according to claim 8, wherein said SIP message handler is configured to receive said SIP message as a SIP 200 OK response to a session initiation request sent towards said terminating user.

10. The node according to claim 2, wherein said SIP message handler is configured to receive said SIP message during said given service session.

11. The node according to claim 10, wherein said SIP message handler is configured to receive said SIP message as a SIP INFO.

12. The node according to claim 2, wherein said network charging system comprises one or both of an offline and an online charging service, said charging generation point using either an Rf or an Ro interface to send said charging data to the charging service.

13. The node according to claim 12, wherein said charging generation point is configured to send details of charges apportioned to the originating user to said online charging service and details of charges apportioned to the terminating user to said offline charging service.

14. The node according to claim 1, wherein said cost apportionment data includes an information element indicating that the terminating user accepts to sponsor the session.

15. A node for use in a telecommunications network and comprising:
   a service session handler for establishing and controlling service sessions on behalf of end users served by the telecommunications network;
   a charging determination point for determining cost apportionment data for service sessions involving registered users as terminating users; and
   a signalling message handler for generating, in respect of a given service session between an originating and a terminating user, a signalling message containing said cost apportionment data initiating apportioning costs between the originating and terminating users for the given service session, the signalling message handler being configured to send the signalling message towards a charging generating point in a peer network serving the originating user;

wherein the peer network serving the originating user is an Internet Protocol Multimedia Subsystem (IMS) network with which the originating user is registered, the signalling message is a Session Initiation Protocol (SIP) message, and the cost apportionment data is in the form of Real Time Transfer of Tariff Information (RTTI) data.

16. The node according to claim 15, wherein said telecommunications network is an IMS network and said served end users are registered with the IMS network, and said signalling message handler being a SIP message handler.

17. The node according to claim 16, the node being configured to operate as a SIP Application Server (AS).

18. The node according to claim 16, wherein said SIP message handler is configured to include said cost apportionment data in the form of an extended RTTI XML schema.

19. The node according to claim 15, wherein said cost apportionment data identifies a proportion of an originating network cost that the terminating user accepts to pay.

20. The node according to claim 15, wherein said charging determination point is configured to report said charging data to a network charging system.

21. The node according to claim 20, wherein said network charging system is an offline billing service, and said charging data includes details of charges apportioned to the terminating user.

22. A method of handling costs associated with a service session established and controlled by a telecommunications network, where a session originating user is served by the telecommunications network and a session terminating user is served by a terminating network, the method comprising:

either during session establishment or during the session, receiving within the telecommunications network a signalling message containing cost apportionment data initiating apportioning costs between the session originating user and the session terminating user, the signalling message sent by or on behalf of the session terminating user;

routing the received signalling message to a node responsible for the service and implementing a charging generation function; and at the node, applying the cost apportionment data to the generation of charging data so that the charging data reflects a required cost apportionment, and sending the charging data to a network charging system;

wherein the telecommunications network is an Internet Protocol Multimedia Subsystem (IMS) network with which the session originating user is registered, the signalling message is a Session Initiation Protocol (SIP) message, the node is a SIP node, and the cost apportionment data is in the form of Real Time Transfer of Tariff Information (RTTI) data.

23. The method according to claim 22, wherein said network charging system comprises one or both of an online charging system and an offline charging function, and the network charging system generates Charging Data Records (CDRs), in accordance with the received charging data, and sends the CDRs to a network Billing Domain, the Billing Domain in turn generating one or more billing records and sending the one or more billing records to a Billing Domain associated with said terminating network.

24. The method according to claim 23, wherein said billing records are Transferred Account Procedure (TAP) records.

25. The method according to claim 23, wherein said cost apportionment data identifies a proportion of an originating network cost that the terminating user accepts to pay, and said billing record(s) identifies to the Billing Domain of the terminating network a cost that it must pay to the telecommunications network as an originating network.

26. The method according to claim 25, further comprising identifying costs apportioned to the session originating user to the online billing system and identifying costs apportioned to the session terminating user to the offline billing system.

27. The method according to claim 22, wherein said cost apportionment data identifies a proportion of an originating network cost that the session terminating user accepts to pay.

28. The method according to claim 22, further comprising, at said terminating network, identifying costs apportioned to the session terminating user to a network charging system of the terminating network via an offline charging system.

* * * * *